United States Patent
Achatz

(10) Patent No.: US 11,667,199 B2
(45) Date of Patent: Jun. 6, 2023

(54) MOTOR VEHICLE WITH AN ELECTRIC MOTOR, IN PARTICULAR A HYBRID OR ELECTRIC VEHICLE

(71) Applicant: Bayerische Motoren Werke Aktiengesellschaft, Munich (DE)

(72) Inventor: Klaus Achatz, Gilching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 754 days.

(21) Appl. No.: 16/439,030

(22) Filed: Jun. 12, 2019

(65) Prior Publication Data

US 2019/0291582 A1 Sep. 26, 2019

Related U.S. Application Data

(63) Continuation of application No. PCT/EP2017/080587, filed on Nov. 28, 2017.

(30) Foreign Application Priority Data

Dec. 13, 2016 (DE) ...................... 10 2016 224 810.3

(51) Int. Cl.
*B60L 3/04* (2006.01)
*B60L 1/04* (2006.01)
*B60L 3/00* (2019.01)

(52) U.S. Cl.
CPC ................... *B60L 3/04* (2013.01); *B60L 1/04* (2013.01); *B60L 3/0015* (2013.01);
(Continued)

(58) Field of Classification Search
CPC ........ B60L 3/04; B60L 3/0046; B60L 3/0015; B60L 2240/59; B60L 2240/549
(Continued)

(56) References Cited

U.S. PATENT DOCUMENTS 4,695,075 A * 9/1987 Kamiji ................ B60R 21/0176
280/735
5,990,572 A * 11/1999 Yasukuni ............. H01H 39/006
180/271
(Continued)

FOREIGN PATENT DOCUMENTS

CN 1649756 A 8/2005
CN 202888787 U 4/2013
(Continued)

OTHER PUBLICATIONS

International Search Report (PCT/ISA/210) issued in PCT Application No. PCT/EP2017/080587 dated Feb. 15, 2018 with English translation (five pages).
(Continued)

*Primary Examiner* — Charles A Fox
*Assistant Examiner* — Michael E Butler
(74) *Attorney, Agent, or Firm* — Crowell & Moring LLP

(57) ABSTRACT

An interruption device is provided in a motor vehicle to interrupt a signal line in an emergency operating state. The interruption device includes a fuse and a resistor in the signal line and first and second switches. The fuse is arranged upstream of the resistor in a signal line direction extending from a low-voltage on-board electrical system to a high-voltage on-board electrical system. The first switch is provided in a first electric line connecting the signal line to ground at a connection point downstream of the resistor, and the second switch is provided in a second electric line which connects the signal line to ground at a connection point between the fuse and the resistor. The first and second switches are open during the normal operation of the motor vehicle and are closed in response to the control signal to interrupt the signal line by separating the fuse.

19 Claims, 1 Drawing Sheet

(52) U.S. Cl.
CPC ........... *B60L 3/0046* (2013.01); *B60L 3/0069* (2013.01); *B60L 3/0007* (2013.01); *B60L 2240/549* (2013.01)

(58) Field of Classification Search
USPC ........................................................ 701/29.2
See application file for complete search history.

(56) References Cited

U.S. PATENT DOCUMENTS

| | | |
|---|---|---|
| 10,137,783 B2 | 11/2018 | Birner et al. |
| 11,180,033 B2* | 11/2021 | Achatz ..................... H02H 7/20 |
| 2006/0163946 A1 | 7/2006 | Henne et al. |
| 2006/0211287 A1* | 9/2006 | Kikuchi ................. B60K 6/445 439/157 |
| 2012/0063044 A1* | 3/2012 | Fukuyama .............. B60L 58/14 361/62 |
| 2013/0307480 A1* | 11/2013 | Boggs ..................... B60L 58/15 320/118 |
| 2015/0115705 A1* | 4/2015 | Toth ........................ B60L 50/51 307/9.1 |
| 2015/0255975 A1* | 9/2015 | Siciak .................... B60R 16/02 307/9.1 |
| 2015/0343904 A1* | 12/2015 | Ikeyama ............... B60L 3/0084 701/22 |
| 2016/0072269 A1 | 3/2016 | Esschendal et al. |
| 2016/0072393 A1* | 3/2016 | McIntyre .......... H02M 3/33584 363/21.1 |
| 2018/0029490 A1* | 2/2018 | Fritz ..................... H02J 7/0068 |

FOREIGN PATENT DOCUMENTS

| | | | |
|---|---|---|---|
| CN | 103208780 A | 7/2013 | |
| CN | 103401217 A | 11/2013 | |
| CN | 103640483 A | 3/2014 | |
| CN | 105324897 A | 2/2016 | |
| DE | 10 2009 039 913 A1 | 6/2010 | |
| DE | 10 2010 029 806 A1 | 12/2011 | |
| DE | 10 2012 006 104 A1 | 9/2013 | |
| DE | 10 2014 001 708 A1 | 8/2015 | |
| JP | 2007181308 * | 7/2012 | ................ B60L 3/04 |

OTHER PUBLICATIONS

German-language Written Opinion (PCT/ISA/237) issued in PCT Application No. PCT/EP2017/080587 dated Feb. 15, 2018 (five pages).

German-language Search Report issued in counterpart German Application No. 10 2016 224 810.3 dated Oct. 13, 2017 with partial English translation (10 pages).

Chinese-language Office Action issued in Chinese Application No. 201780075242.9 dated Dec. 7, 2021 with English translation (22 pages).

* cited by examiner

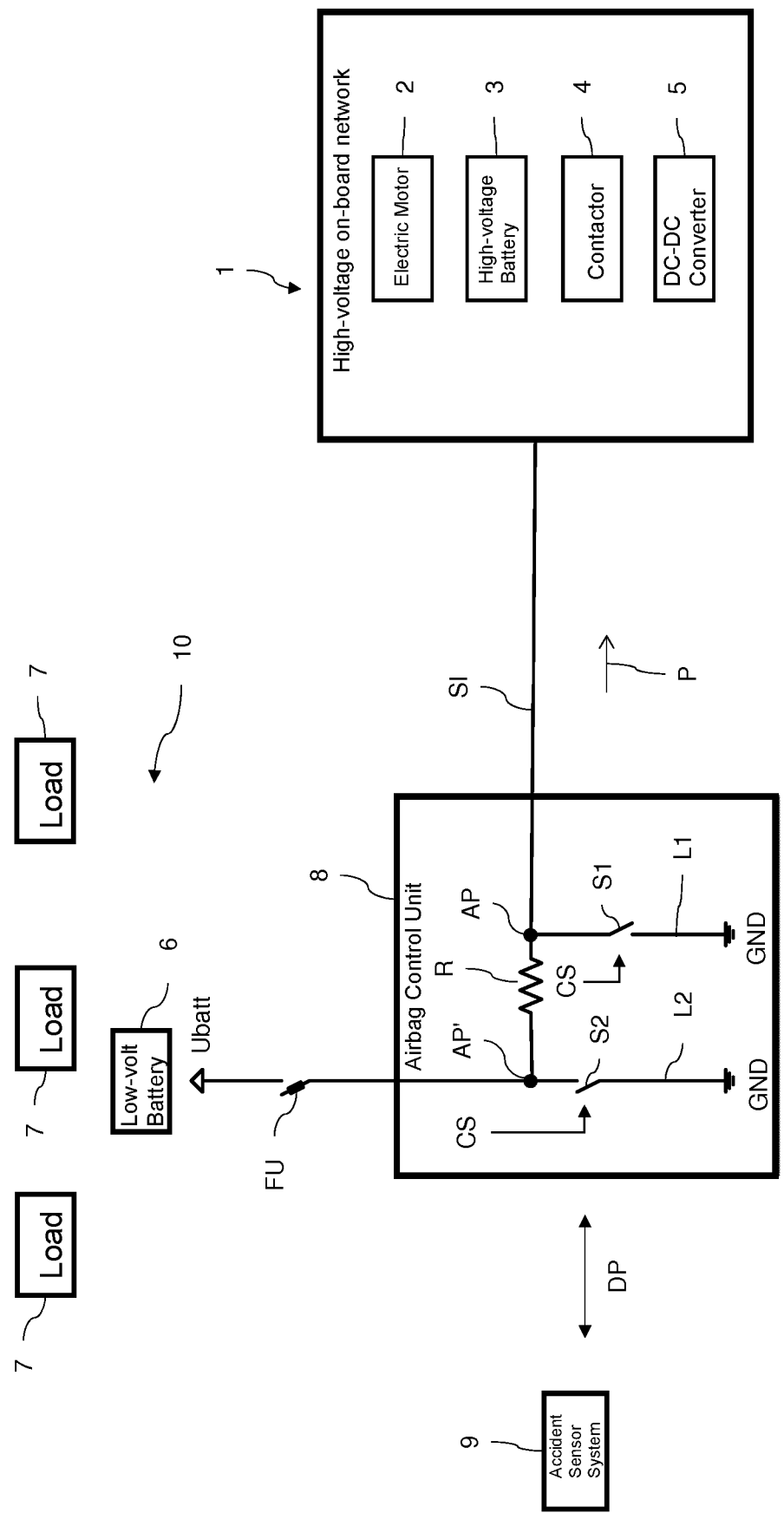

MOTOR VEHICLE WITH AN ELECTRIC MOTOR, IN PARTICULAR A HYBRID OR ELECTRIC VEHICLE

CROSS REFERENCE TO RELATED APPLICATIONS

This application is a continuation of PCT International Application No. PCT/EP2017/080587, filed Nov. 28, 2017, which claims priority under 35 U.S.C. § 119 from German Patent Application No. 10 2016 224 810.3, filed Dec. 13, 2016, the entire disclosures of which are herein expressly incorporated by reference.

BACKGROUND AND SUMMARY OF THE INVENTION

The invention relates to a motor vehicle with an electric motor, in particular a hybrid or electric vehicle.

Motor vehicles which employ an electric motor for their propulsion, either exclusively or when required, generally have a high-voltage on-board network having a high-voltage energy store, by means of which the electric motor is supplied. Motor vehicles of this type also have a low-voltage on-board network having a low-voltage energy store. By means of the low-voltage on-board network, electrical loads in the motor vehicle are supplied with energy. It is known that, in the normal operation of the motor vehicle, an electric signal line is energized by the low-voltage on-board network. In emergency operation, this electric signal line is interrupted, whereafter the high-voltage energy store is isolated from the remainder of the high-voltage energy network.

For the interruption of the above-described electric signal line, in the prior art pyrotechnic elements are employed, which also interrupt a load path between the low-voltage on-board network and a generator. Although pyrotechnic elements can ensure a rapid interruption of high loads, they are complex and expensive. Therefore, in the above-mentioned signal line, they should, if possible, be replaced by other elements, which will nevertheless continue to ensure a short switching time.

Published document DE 10 2010 029 806 A1 discloses an electrical system for a vehicle, having an electric power source for the propulsion of the vehicle. By the actuation of a switch, the power source is isolated from the on-board network and connected to a short-circuit line. The power source incorporates a separator which, by the action of the heat of the short-circuit current in the short-circuit line, actuates the interruption of the short-circuit line.

The object of the invention is the provision of a motor vehicle with an electric motor, the high-voltage energy store of which, by means of a signal line which is supplied by a low-voltage on-board network, can be simply and rapidly isolated from the high-voltage on-board network.

This object is fulfilled by the motor vehicle according to patent claim 1. Developments of the invention are defined in the dependent claims.

The motor vehicle according to the invention is equipped with an electric motor, which is provided for the propulsion of the motor vehicle. Where applicable, the electric motor can also be employed for the recovery of energy by operation in generator mode. The motor vehicle according to the invention comprises a high-voltage on-board network with a high-voltage energy store, by means of which electrical energy is supplied for the electric motor. In the motor vehicle, a low-voltage on-board network is additionally provided for the supply of electric power to a number of loads, wherein the low-voltage on-board network comprises a low-voltage energy store. In this context, and hereinafter, a high-voltage energy store and a low-voltage energy store are to be understood as energy stores which deliver a DC voltage and consequently a direct current. Accordingly, an inverter is intermediately connected in-circuit for the propulsion of the electric motor. Preferably, the high-voltage energy store and/or the low-voltage energy store is a battery.

In the motor vehicle according to the invention, an electric signal line is provided which, in the normal operation of the motor vehicle, is energized by the voltage of the low-voltage on-board network and separates the high-voltage energy store from the high-voltage on-board network when not energized. The signal line leads from the low-voltage on-board network to the high-voltage on-board network. An interruption device is further provided in the motor vehicle, in order to interrupt the signal line in response to a control signal which is output by a control unit of the motor vehicle in the event of the switchover of the motor vehicle to an emergency operating state which deviates from the normal operation of the motor vehicle.

The motor vehicle according to the invention is characterized by a novel configuration of an interruption device. The interruption device comprises a fuse and a resistor, which are provided in the signal line, together with a first and a second switch, which are preferably semiconductor switches, e.g., transistors.

In a specified direction of the signal line, which extends from the low-voltage on-board network to the high-voltage on-board network, the fuse is arranged up-circuit of the resistor. Moreover, the first switch is provided in a first electric line, which connects the signal line to ground at a connection point down-circuit of the resistor, in the specified direction. Conversely, the second switch is provided in a second electric line, which connects the signal line to ground at a connection point between the fuse and the resistor. The interruption device is configured such that the first and second switches are open during the normal operation of the motor vehicle, and are closed in response to the control signal. With the switches in the closed state, the signal line is interrupted by the separation of the fuse. In other words, the closing of the first and second switch results in a short-circuit current in the signal line, which causes the melting of the fuse and thus the interruption of the signal line.

The invention has the advantage that the above-described first switch, immediately upon the closing thereof, diverts the current on the signal line to ground, such that no further current is conducted to the high-voltage on-board network on the signal line. In this manner, the first switch bridges the time interval until the melting of the fuse such that, already upon the closing of the first and second switches, the infeed of current to the high-voltage on-board network is suppressed, even if the fuse has yet to interrupt the signal line. After a specific time interval, the melting of the fuse, and thus the irreversible interruption of the signal line, then ensues, which is absolutely essential for the provision of effective protection in an emergency operating state. The interruption device according to the invention constitutes a replacement solution for an expensive pyrotechnic element and, in this context, can be understood as an electrically emulated pyrofuse. Switching times of equal rapidity to those of pyrotechnic elements are achieved, wherein the interruption device, however, is significantly more cost-effective than a pyrotechnic element.

In a particularly preferred embodiment, the high-voltage on-board network of the motor vehicle comprises one or more switching components, which can be actuated via the signal line, wherein the switching component(s) is (are) closed when the signal line is energized, and opened when the signal line is not energized, thereby isolating the high-voltage energy store from the high-voltage on-board network. The switching components can be configured in various forms. Preferably, at least a proportion of the switching components, and in particular all the switching components, are contactors.

In a further variant of the motor vehicle according to the invention, the high-voltage on-board network comprises a DC-to-DC converter for the supply of current from the high-voltage energy store to the low-voltage on-board network, wherein the DC-to-DC converter is activated when the signal line is energized, and is deactivated when the signal line is not energized. In the deactivated state of the DC-to-DC converter, the low-voltage energy store is isolated from the high-voltage energy store. In this variant of the invention, the low-voltage energy store is also decoupled from the high-voltage on-board network by means of the signal line, in the event of an emergency operating state of the motor vehicle.

In a further particularly preferred embodiment, the motor vehicle comprises a sensor system for the detection of the emergency operating state, wherein the control unit is configured such that, upon the detection of the emergency operating state by the sensor system, it outputs the control signal for the closing of the first and second switch. Depending upon the configuration, the sensor system can be integrated in the control unit, or can also be separated from the latter. Preferably, the sensor system is an accident sensor system which, by means of a number of sensors, detects an accident of the motor vehicle as an emergency operating state. In a manner which is known per se, the sensors can comprise, e.g., rotational speed sensors and/or acceleration sensors. In a preferred variant of the invention, the control unit is an airbag control unit.

In a further particularly preferred embodiment, the low-voltage on-board network has a voltage of 60 V or less, particularly of 12 V. Conversely, the high-voltage on-board network preferably has a voltage in excess of 60 V, particularly between greater than 60 V and at maximum 1,500 V, particularly preferably between 300 V and 1,500 V, and preferably of 400 V. Moreover, the motor vehicle is preferably configured such that the signal line, in the normal operation of the motor vehicle, is energized with a current of 20 mA or lower. In a preferred variant, the above-described resistor lies between 100 Ω and 1,000Ω.

Other objects, advantages and novel features of the present invention will become apparent from the following detailed description of one or more preferred embodiments when considered in conjunction with the accompanying drawing.

BRIEF DESCRIPTION OF THE DRAWING

An exemplary embodiment of the invention is described in detail hereinafter, with reference to the attached FIGURE. This FIGURE shows a schematic circuit diagram, incorporating an interruption device for the interruption of an electric signal line, in one form of embodiment of a motor vehicle according to the invention.

DETAILED DESCRIPTION OF THE DRAWING

One form of embodiment of the invention is described hereinafter with reference to a motor vehicle which can be electrically powered by means of an electric motor which is supplied with electric current by a high-voltage energy store in the form of a high-voltage battery. If required, the electric motor can also operate as an electric generator, and can generate electrical energy by operation in recovery mode, which is then stored in the high-voltage battery.

The FIGURE shows a schematic representation of the components, which are essential to the invention, of the corresponding motor vehicle. The vehicle comprises a high-voltage on-board network 1, which includes the electric motor 2 already described above and the high-voltage battery 3. The high-voltage on-board network 1 further comprises a plurality of contactors, the totality of which is represented by the reference number 4, and a DC-to-DC converter 5, which converts direct current from the high-voltage battery into a direct current with a lower current intensity, in order to supply this direct current to the low-voltage battery, identified by reference number 6, of a low-voltage on-board network 10. In the interests of clarity, the electrical connection between the DC-to-DC converter 5 and the low-voltage battery 6 is not represented in the FIGURE. In the form of embodiment described here, the voltage of the high-voltage on-board network 1 is of the order of 400 V. Conversely, the voltage Ubatt of the low-voltage on-board network 10 is of the order of 12 V.

By means of the low-voltage on-board network 10, various loads in the motor vehicle are supplied with current, wherein, in the FIGURE, only a number of such loads 7 are schematically represented. Depending upon the operating mode, the loads can be supplied by the low-voltage battery 5, or by a generator in the low-voltage on-board network. The loads can include, for example, the navigation system in the motor vehicle, assistance systems in the motor vehicle, the vehicle lighting system or similar. Moreover, the control unit 8, which is described hereinafter, also and the accident sensor system 9, which is described hereinafter, also constitute loads which are supplied via the low-voltage on-board network 10. An electric signal line SI extends between the low-voltage on-board network 10 and the high-voltage on-board network 1, which assumes the potential Ubatt. In the representation of the FIGURE, the signal line SI is initially routed from the low-voltage on-board network perpendicularly downwards to a connection point AP', and then extends to the right from the connection point in a horizontal direction to the high-voltage on-board network 1. This routing direction is indicated in the FIGURE by the arrow P. In the normal operation of the motor vehicle, the signal line is energized with a low current in the region between 20 mA and 100 mA.

By means of the signal line SI, inter alia, the contactors 4 and the DC-to-DC converter 5 are actuated. When the signal line SI is energized, the contactors 4 are closed and the DC-to-DC converter 5 is activated. In the absence of energization of the signal line SI, the contactors 4 are opened, as a result of which the high-voltage battery 2 is isolated from the remainder of the high-voltage on-board network 1. Moreover, in the absence of energization of the signal line SI, the DC-to-DC converter is deactivated. By a variation of the energization of the signal line SI, a protective function is thus achieved in the motor vehicle for the disconnection of the high-voltage on-board network 1.

For the interruption of the signal line SI, which is executed in the event of an accident, a fast-response interruption circuit is provided, which comprises a fuse FU, a resistor R and two switches S1 and S2. In the form of embodiment represented in the FIGURE, the resistor and the switches are part of an airbag control unit 8 which, in the event of an accident, opens both switches S1 and S2 by means of a corresponding control signal CS. To this end, the control unit 8 communicates with an accident sensor system 9, as indicated by the double-headed arrow DP. In a manner which is known per se, the accident sensor system incorporates a plurality of sensors, by means of which an accident of the motor vehicle is detected. The sensors comprise, inter alia, acceleration sensors and rotational speed sensors. If an accident is detected by the accident sensor system 9, the airbag control unit 8 firstly deploys the airbags in the motor vehicle, and secondly outputs the control signal CS to the switches S1 and S2, which close in response thereto. The switches S1 and S2 are semiconductor switches which are known per se, such as e.g. FETs (field effect transistors).

The switch S1 is provided in a line L1, which is connected to ground or GND at the connection point AP, down-circuit of the resistor R. Conversely, the switch S2 is provided in a line L2, which is connected to the signal line SI at the connection point AP' between the fuse FU and the resistor R. The resistor R has a resistance between 100 Ω and 1,000Ω. By means of the interruption circuit represented, comprised of the fuse FU, the resistor R and the switches S1 and S2, the line SI can be very rapidly de-energized, in a manner which is not possible by the use of the fuse FU alone. The response time for the interruption of the current is in the region of less than 100 μs, as against 20 to 30 ms, if only the fuse FU is employed for the interruption. The interruption of the line is thus achieved at a comparable speed to that associated with conventionally employed pyroswitches, although the costs associated with the interruption circuit are substantially lower.

The mode of operation for the interruption of current in the line SI by the interruption device is described hereinafter. In the event of an accident, firstly the two switches S1 and S2 are closed by means of the corresponding control signal CS. By the closure of the switch S1, the current on the signal line SI flows to ground GND via the resistor R, as a result of which no further current is fed to the high-voltage on-board network. Moreover, a short-circuit current flows via the fuse FU and the line L2 from the low-voltage on-board network 10 to ground. This results in melting of the fuse FU, and thus an irreversible interruption of the signal line SI. However, the fuse requires a certain response time in order to achieve separation. In order to ensure that the infeed of current via the signal line is nevertheless suppressed immediately upon the closing of the switches S1 and S2, the above-described switch S1 is employed which, upon the closing thereof, immediately diverts the current to ground, until such time that the fuse FU melts in response to the short-circuit current and the signal line SI is interrupted.

The above-described embodiments of the invention have a series of advantages. In particular, for the isolation of a high-voltage battery from the high-voltage on-board network, it is not necessary to employ an expensive pyrotechnic element as a fuse. Instead, a cost-effective interruption circuit comprised of a fuse, a resistor and switches can be employed for this purpose, the response time of which is nevertheless in the range of that associated with a pyrotechnic element. Moreover, in exactly the same way as pyrofuses, the irreversibility of the interruption of the signal path by the fuse is ensured.

LIST OF REFERENCE SYMBOLS

1 High-voltage on-board network
2 Electric motor
3 High-voltage battery
4 Contactors
5 DC-to-DC converter
6 Low-voltage battery
7 Electric loads
8 Airbag control unit
9 Accident sensor system
10 Low-voltage on-board network
FU Fuse
R Resistor
SI Electric signal line
S1, S2 Switches
L1, L2 Electric lines
CS Control signal
AP, AP' Connection points
P Arrow
DP Double-headed arrow
GND Ground
Ubatt Voltage of the low-voltage on-board network The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle with an electric motor, comprising:
a high-voltage on-board network with a high-voltage energy store that supplies electrical energy to the electric motor for propulsion of the motor vehicle;
a low-voltage on-board network that supplies electric power to a plurality of loads in the motor vehicle;
wherein the low-voltage on-board network includes a low-voltage energy store, wherein an electric signal line is provided which, in a normal operation of the motor vehicle, is energized by a voltage of the low-voltage on-board network and separates the high-voltage energy store from the high-voltage on-board network when not energized, wherein the signal line leads from the low-voltage on-board network to the high-voltage on-board network; and
an interruption device configured to interrupt the signal line in response to a control signal which is output by a control unit of the motor vehicle in the event of a switchover of the motor vehicle to an emergency operating state which deviates from the normal operation of the motor vehicle, the interruption device including a fuse and a resistor in the signal line, and a first switch and a second switch;
wherein in a specified direction of the signal line, which extends from the low-voltage on-board network to the high-voltage on-board network, the fuse is arranged up-circuit of the resistor;
wherein the first switch is provided in a first electric line, which connects the signal line to ground at a connection point down-circuit of the resistor, in the specified direction;
wherein the second switch is provided in a second electric line, which connects the signal line to ground at a connection point between the fuse and the resistor;
wherein the interruption device is configured such that the first and second switches are open during the normal operation of the motor vehicle, and are closed in response to the control signal, in order to interrupt the signal line by the separation of the fuse; and
wherein the high-voltage on-board network comprises a DC-to-DC converter that supplies current from the high-voltage energy store to the low-voltage energy store, wherein the DC-to-DC converter is activated when the signal line is energized and is deactivated when the signal line is not energized.

2. The motor vehicle according to claim 1, wherein at least one of the first switch and the second switch is a semiconductor switch.

3. The motor vehicle according to claim 2, wherein the high-voltage on-board network comprises a switching component, which can be actuated via the signal line, wherein the switching component is closed when the signal line is energized and opened when the signal line is not energized, thereby isolating the high-voltage energy store from the high-voltage on-board network.

4. The motor vehicle according to claim 2, wherein the high-voltage on-board network comprises a DC-to-DC converter that supplies current from the high-voltage energy store to the low-voltage energy store, wherein the DC-to-DC converter is activated when the signal line is energized and is deactivated when the signal line is not energized.

5. The motor vehicle according claim 2, wherein the motor vehicle comprises a sensor system that detects the emergency operating state, wherein the control unit is configured such at, upon detection of the emergency operating state by the sensor system, the control unit outputs the control signal for the closing of the first and second switches.

6. The motor vehicle according to claim 2, wherein the motor vehicle is configured such that the signal line, in the normal operation of the motor vehicle, is energized with a current of 100 mA or less.

7. The motor vehicle according to claim 2, wherein the resistor in the signal line has a resistance of between 100Ω and 1,000 Ω.

8. The motor vehicle according to claim 1, wherein the high-voltage on-board network comprises a switching component, which can be actuated via the signal line, wherein the switching component is closed when the signal line is energized and opened when the signal line is not energized, thereby isolating the high-voltage energy store from the high-voltage on-board network.

9. The motor vehicle according to claim 8, wherein the high-voltage on-board network comprises a DC-to-DC converter that supplies current from the high-voltage energy store to the low-voltage energy store, wherein the DC-to-DC converter is activated when the signal line is energized and is deactivated when the signal line is not energized.

10. The motor vehicle according claim 8, wherein the motor vehicle comprises a sensor system that detects the emergency operating state, wherein the control unit is configured such at, upon detection of the emergency operating state by the sensor system, the control unit outputs the control signal for the closing of the first and second switches.

11. The motor vehicle according to claim 1, wherein the motor vehicle comprises a sensor system that detects the emergency operating state, wherein the control unit is configured such at, upon detection of the emergency operating state by the sensor system, the control unit outputs the control signal for the closing of the first and second switches.

12. The motor vehicle according to claim 11, wherein the sensor system is an accident sensor system that detects, with a plurality of sensors, an accident of the motor vehicle as the emergency operating state.

13. The motor vehicle according claim 1, wherein the low-voltage on-board network has a voltage of 60 V or less.

14. The motor vehicle according claim 13, wherein the low-voltage on-board network has a voltage of 12 V.

15. The motor vehicle according to claim 1, wherein the high-voltage on-board network has a voltage greater than 60 V.

16. The motor vehicle according to claim 15, wherein the high-voltage on-board network has the voltage of greater than 60 V and less than or equal to 1,500 V.

17. The motor vehicle according to claim 16, wherein the high-voltage on-board network has a voltage of 400 V.

18. The motor vehicle according to claim 1, wherein the motor vehicle is configured such that the signal line, in the normal operation of the motor vehicle, is energized with a current of 100 mA or less.

19. The motor vehicle according to claim 1, wherein the resistor in the signal line has a resistance of between 100Ω and 1,000 Ω.

* * * * *